(12) United States Patent
Stephens, Jr.

(10) Patent No.: US 6,644,764 B2
(45) Date of Patent: *Nov. 11, 2003

(54) INTEGRATED PRINTING/SCANNING SYSTEM USING INVISIBLE INK FOR DOCUMENT TRACKING

(75) Inventor: Ronald D. Stephens, Jr., Escondido, CA (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,589

(22) Filed: Oct. 28, 1998

(65) Prior Publication Data

US 2002/0063744 A1 May 30, 2002

(51) Int. Cl.$^7$ .............................. G06K 5/00; B41J 2/01
(52) U.S. Cl. ........................................... 347/3; 347/107
(58) Field of Search ................................ 235/462, 491, 235/468; 347/2, 3, 98, 107, 19; 399/2

(56) References Cited

U.S. PATENT DOCUMENTS

| | | | | |
|---|---|---|---|---|
| 3,519,124 A | | 7/1970 | Barker et al. .................. | 206/57 |
| 3,614,430 A | * | 10/1971 | Berler .................. | 235/61.12 N |
| 3,618,752 A | | 11/1971 | Barker et al. .................. | 206/57 |
| 3,763,356 A | * | 10/1973 | Berler .................. | 235/61.12 N |
| 3,944,710 A | | 3/1976 | Parent .......................... | 428/412 |
| 3,949,148 A | | 4/1976 | Akman ........................ | 428/500 |

(List continued on next page.)

FOREIGN PATENT DOCUMENTS

| | | |
|---|---|---|
| EP | 0 288 568 B1 | 6/1993 |
| EP | 0789316 A2 | 8/1997 |
| EP | 0884195 A1 | 12/1998 |
| GB | 2272861 A | 6/1994 |
| GB | 2278002 A | 11/1994 |
| JP | 57-76554 | 5/1982 |
| JP | 57-122448 | 7/1982 |

OTHER PUBLICATIONS

Xerox Disclosure Journal, Infrared Sensitive Pigment Based Ink Jet Inks, vol. 22, No. 2 Mar./Apr. 1997 pp. 71–72.

*Primary Examiner*—Stephen D. Meier
*Assistant Examiner*—Julian D. Huffman (57) ABSTRACT

A document printing and verification system and method. The system includes a printing apparatus for printing an image on a print medium, and an inkjet printer apparatus for printing an invisible identification pattern such as a barcode on the print medium which is invisible to the naked eye under normal ambient illumination. A scanner apparatus is positioned for producing an image of the identification image for verification use. The scanner apparatus includes a light source for illuminating an imaging zone with light including nonvisible energy components and a camera sensitive to nonvisible light from the print medium to form an image of the nonvisible identification image. The inkjet printhead is a high resolution printhead adapted to provide inkjet barcode printing resolution at least as high as 600 dots per inch, improving edge acuity of the pattern, and permits very high density information to be imprinted on the document page. The inkjet ink includes a UV dye and an FR/IR dye. The UV dye when illuminated with UV light provides an image of the barcode which is visible to the naked eye. The FR/IR dye is imaged using an FR/IR camera to capture electronically an image of the barcode.

27 Claims, 5 Drawing Sheets

U.S. PATENT DOCUMENTS

| | | | |
|---|---|---|---|
| 4,051,285 A | 9/1977 | Kramer | 428/43 |
| 4,188,139 A | 2/1980 | Pasini et al. | 400/696 |
| 4,243,694 A | 1/1981 | Mansukhani | 427/14.1 |
| 4,529,688 A | 7/1985 | Law et al. | 430/494 |
| 4,533,926 A | 8/1985 | Foldvari et al. | 346/136 |
| 4,595,931 A * | 6/1986 | Toganoh et al. | 346/1.1 |
| 4,721,058 A | 1/1988 | Hayamizu et al. | 118/665 |
| 4,782,365 A | 11/1988 | Takagi | 355/38 |
| 4,788,563 A | 11/1988 | Omo et al. | 346/140 R |
| 4,816,386 A | 3/1989 | Gotoh et al. | 430/495 |
| 4,864,324 A | 9/1989 | Shirota et al. | 346/1.1 |
| 5,081,596 A * | 1/1992 | Vincent et al. | 395/104 |
| 5,093,147 A | 3/1992 | Andrus et al. | 427/7 |
| 5,123,960 A | 6/1992 | Shirota et al. | 106/22 |
| 5,130,726 A | 7/1992 | Fukushima et al. | 346/140 |
| 5,138,463 A | 8/1992 | Morimoto et al. | 358/296 |
| 5,146,087 A | 9/1992 | VanDusen | 250/271 |
| 5,276,628 A * | 1/1994 | Schneiderhan | 271/259 |
| 5,282,894 A | 2/1994 | Albert et al. | 106/22 D |
| 5,286,286 A * | 2/1994 | Winnik et al. | 106/31.15 |
| 5,296,023 A | 3/1994 | Gregory et al. | 106/22 D |
| 5,301,044 A | 4/1994 | Wright | 358/500 |
| 5,336,714 A | 8/1994 | Krutak et al. | 524/608 |
| 5,348,348 A | 9/1994 | Hanada et al. | 283/91 |
| 5,422,659 A | 6/1995 | Titterington et al. | 347/101 |
| 5,467,119 A | 11/1995 | Richtsmeier et al. | 347/102 |
| 5,528,154 A | 6/1996 | Leichner et al. | 324/693 |
| 5,542,972 A | 8/1996 | von der Eltz et al. | 106/22 H |
| 5,547,501 A * | 8/1996 | Maruyama et al. | 106/21 |
| 5,563,401 A | 10/1996 | Lemelson | 235/494 |
| 5,592,561 A * | 1/1997 | Moore | 382/103 |
| 5,614,008 A | 3/1997 | Escano et al. | 106/23 D |
| 5,679,115 A | 10/1997 | Fritzsche et al. | 8/444 |
| 5,684,069 A | 11/1997 | Auslander | 524/88 |
| 5,686,725 A | 11/1997 | Maruyama et al. | 250/271 |
| 5,701,547 A | 12/1997 | Yamada et al. | 399/1 |
| 5,702,511 A | 12/1997 | de Saint-Romain et al. | 106/31.32 |
| 5,723,202 A | 3/1998 | Mueller et al. | 428/194 |
| 5,724,259 A * | 3/1998 | Seymour et al. | 364/256 |
| 5,729,785 A * | 3/1998 | Sakaizawa et al. | 399/2 |
| 5,781,708 A | 7/1998 | Austin et al. | 395/106 |
| 5,815,174 A * | 9/1998 | Stone | 347/19 |
| 5,816,165 A | 10/1998 | Huston | 101/490 |
| 5,818,032 A * | 10/1998 | Sun et al. | 235/494 |
| 5,852,745 A | 12/1998 | Fontal et al. | 395/835 |

* cited by examiner

FIG. 2A 20
600 dpi 10
300 dpi

INTEGRATED PRINTING/SCANNING SYSTEM USING INVISIBLE INK FOR DOCUMENT TRACKING

TECHNICAL FIELD OF THE INVENTION

This invention relates to printing systems that imprint documents with a barcode and utilize downstream processes to track that the current number of pages in the document are present, and more particularly to such printing and tracking systems which utilize invisible ink for the barcoding.

BACKGROUND OF THE INVENTION

Electrophotographic printing systems are known that print black barcodes during the printing of documents, and use barcode scanners in downstream processing to verify information and to check that the proper number of pages are present in the document. These systems are typically used for the printing and tracking of insurance documents, checks, manuals and other print-on-demand documents. Some customers find objectionable the appearance of visible barcodes on their documents.

Conventional industrial inkjet barcode printers typically use printheads having a dot per inch spacing of 150 dots per inch (dpi) to 240 dpi, and have traditionally been continuous inkjet printers. These low dpi printheads produce drops that are large and consequently produce spot sizes on the print media that are relatively large. Ink formulation is also important in determining the spot size. It is this spot size that fundamentally determines the minimum barcode sizes that a printhead can print.

Accordingly, it would represent an advance in the art to provide a technique for imprinting barcodes on documents and subsequently scanning the documents for verification purposes which did not rely on visible barcode features.

It would further represent an advance in the art to provide a technique for producing smaller, denser barcodes on documents, and thereby increase the amount of data to be stored in a given area, increase the edge acuity of the printed barcodes and resulting scan reliability of the system.

SUMMARY OF THE INVENTION

A document printing and verification system is described. The system includes a printing apparatus for printing an image on a print medium, and an inkjet printer apparatus for printing an invisible identification pattern on the print medium which is invisible to the unaided eye under natural illumination. A scanner apparatus is positioned for producing an image of the identification image for verification use. The scanner apparatus includes a light source for illuminating an imaging zone with light including nonvisible energy components and a camera sensitive to nonvisible light from the print medium to form an image of the nonvisible identification image.

In accordance with another aspect of the invention, the inkjet printhead is a high resolution printhead adapted to provide inkjet barcode printing resolution at least as high as 600 dots per inch. This improves the edge acuity of the barcodes, and permits very high density barcode information to be imprinted on the document page.

In accordance with another aspect, the ink used to form the invisible barcode includes a UV dye and an FR/IR dye. The UV dye when illuminated with UV light provides an image of the barcode which is visible to the unaided eye, providing a visual check on the system operability. The FR/IR dye is imaged using an FR/IR camera to capture electronically an image of the barcode. The captured image is then used by the controller for verification purposes.

Yet another aspect of the invention includes backlighting the document page with FR/IR energy, and capturing an image of the barcode with an FR/IR sensitive camera. The FR/IR energy penetrates the page sufficiently to excite the FR/IR dye in the barcode ink.

Another aspect of the invention is a method for document printing and verification, comprising the following steps:

printing a page of a document;

printing an identification pattern on the document page using an inkjet printer, the pattern printed with ink which is invisible to the unaided eye under natural light illumination;

illuminating the document page with light energy including energy components in a non-visible band;

electronically capturing an image of the identification pattern at the imaging zone; and performing a verification procedure using the electronically captured image.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
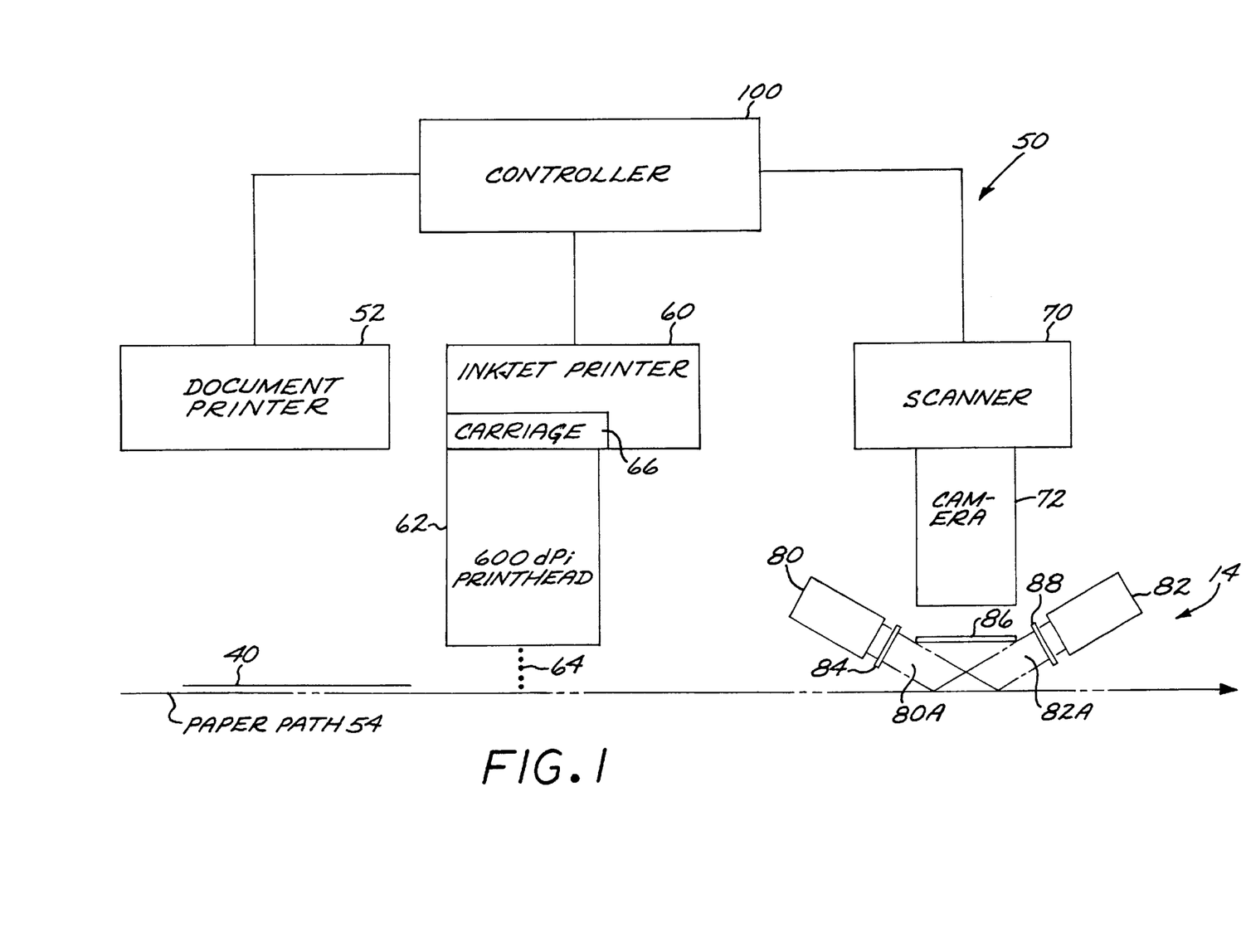
FIG. 1 is a schematic block diagram of a document printing and verification system employing the invention.

An exemplary document printing and verification system 50 in accordance with the invention is shown in schematic form in FIG. 1. This system includes a printer apparatus 52 positioned along the paper path 54 for printing desired text and/or graphical indicia onto the surface of a print medium 40. The printer apparatus 52 can be, for example an electrophotographic printer, e.g. a laser printer, an LED printer, an inkjet printer, or any other type of printing system. The printer apparatus 52 in an exemplary embodiment is a laser printer, under control of a system controller 100, which coordinates the printing of documents by the printer 52 and the verification processes performed by the barcode printer 60 and scanner 70 downstream of the electrophotographic printer 60.

Positioned downstream of the printer apparatus 52 along the paper path 54 is an inkjet printing apparatus 60 for printing a barcode on the print medium 40. In accordance with an aspect of the invention, the inkjet printer 60 includes a high resolution, 600 dpi printhead 62 which ejects droplets 64 of invisible ink to print the barcode. The printer 60 includes a carriage 66 for holding the printhead 62. The printhead is connected via a fluid path to an ink reservoir, preferably a reservoir capable of holding a large ink volume, say on the order of 350 cc or greater.

As used in this description of the invention, "invisible" inks involve a broad class of ink formulations which cannot be seen by the unaided eye when applied to a substrate and viewed with "natural" light (e.g. light from the sun) or light from conventional incandescent lamps and the like. Both of these light forms (as well as other forms which are normally used for general illumination purposes in home, businesses and like) are collectively characterized as "white" light which involves a combination of all the various colored light components which fall within a wavelength range of about 300–700 nm. Under these illumination conditions, the invisible ink compositions are essentially colorless. Only after illumination with other, more narrow light wavelengths do the printed images become visible or otherwise detectable (either with or without auxiliary observation equipment).

Figures 2A, 2B:
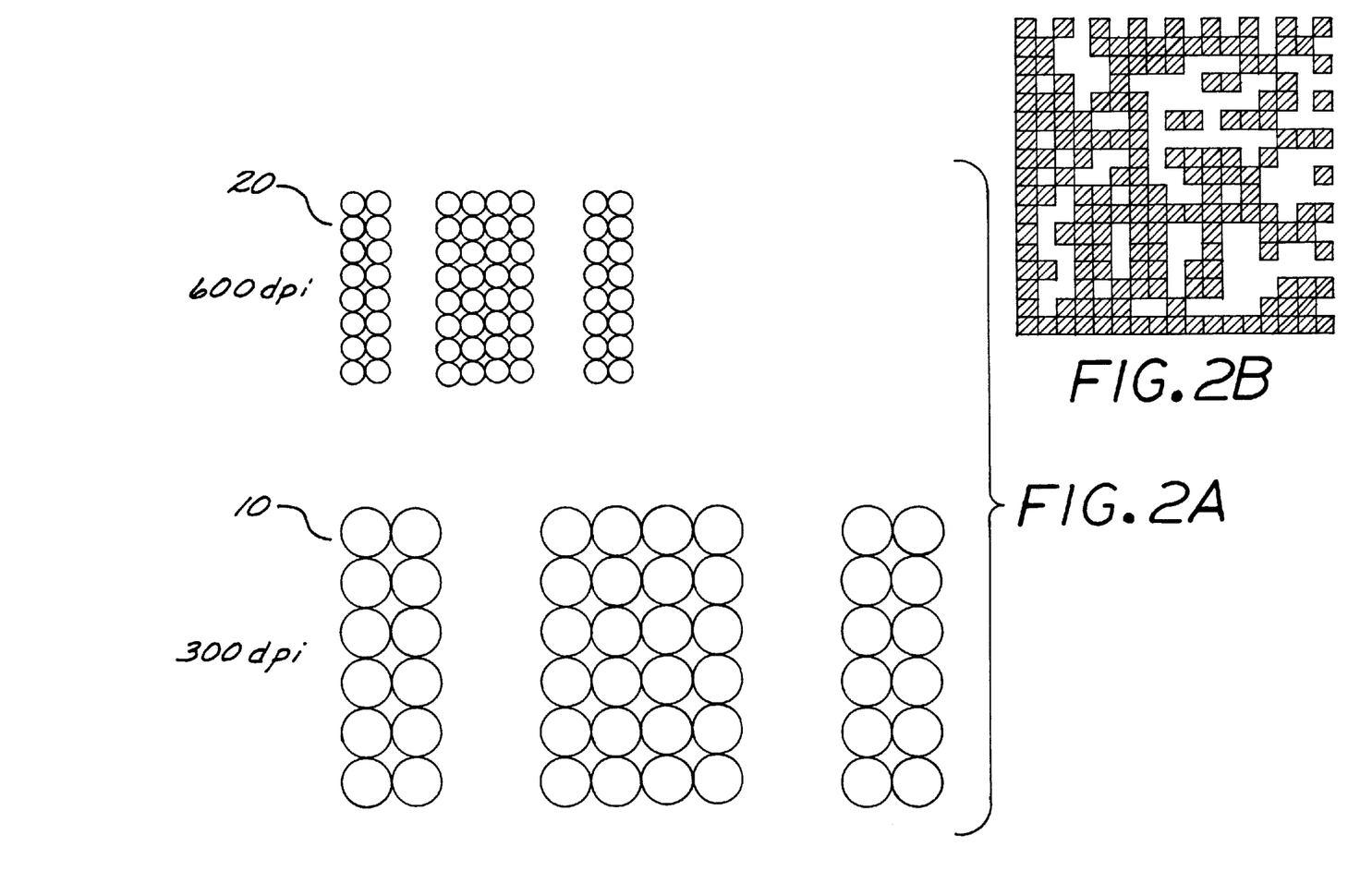
FIG. 2A is a diagrammatic representation of respective barcode patterns printed with a 300 dpi resolution and a 600 dpi resolution.
FIG. 2B shows an exemplary two-dimensional barcode.

The printhead 62 with 600 dpi resolution is used with small spot size inks to produce smaller, denser one or two dimensional barcodes than are possible with conventional, low resolution barcode inkjet printers. These barcodes allow more data to be stored in a given printed area. By reducing the spot size, the edge acuity of the printed barcodes is increased, thereby increasing the scan reliability of the system. FIG. 2A diagrammatically depicts a one-dimensional bar code 10 printed with a 300 dpi printhead, and the same one-dimensional barcode 20 but printed with a 600 dpi printhead using small spot size ink. As illustrated in FIG. 2A, the 600 dpi barcode 20 requires much less area than does the 300 dpi barcode 10. The printhead 62 can also be used to print two-dimensional barcode patterns; an exemplary two-dimensional pattern is illustrated in FIG. 2B.

A scanner 70 is disposed along the paper path 54 downstream of the inkjet printer 60. The scanner 70 includes a camera 72 for capturing an image of the barcodes on the paper passing by the camera at an imaging zone 76. The imaging zone is illuminated by a first lamp 80 emitting a light beam 80A, through filter 84 and incident on the imaging zone. The imaging zone is further illuminated by a second lamp 82 emitting a light beam 82A, through filter 88 and incident on the imaging zone. Light reflected from the paper is then passed through the filter 86 and to the camera 72.

Two illumination sources are provided in this exemplary embodiment because a single side light source tends to produce non-uniform illumination of the media being imaged by the camera. Two sources positioned on opposite sides of the media produce a more uniform illumination of the sample. Of course, for some implementations, a single side illumination source can produce acceptable results, thereby simplifying the system.

The ink droplets 64 emitted by the printhead 62 in this exemplary embodiment have two dyes invisible under natural light illumination. One dye is a UV dye which, when illuminated by UV light of appropriate intensity, gives off a visible emission, permitting quick visual checking on the printing line to ensure the printing and verification system is working properly. The second dye is a far red ("FR")/infrared ("IR") dye which when illuminated by FR/IR energy of appropriate intensity gives off an emission which is detectable by the camera 72 to provide an image of the barcode. Far red light normally involves a wavelength range of about 650 nm to 700 nm, with infrared light involving a wavelength range which exceeds about 700 nm up to about 1000 nm. The FR/IR dye provides media independence and system robustness, since papers are less efficient at absorbing FR/IR wavelength energy than UV wavelength energy, resulting in stronger emissions at FR/IR.

Inks suitable for the purpose is described in co-pending application entitled INVISIBLE IR/UV SENSITIVE INK COMPOSITIONS AND METHODS FOR USING THE SAME, Attorney Docket Number 10980234-1, the entire contents of which are incorporated herein by this reference.

The illumination sources produce light beams having significant energy in the UV and FR/IR wavelength bands. In an exemplary embodiment, the illumination sources 80, 82 are metal halide lamps to produce UV and RF/IR light components. In another embodiment, standard halogen light fixtures can be used as the illumination sources 80, 82, to produce light with FR/IR components. Because halogen lamps will not produce light energy in the UV band to excite the UV dye, a hand-held black light can be employed in this alternate embodiment to verify that the barcode printer is printing properly.

Ideally, the lamp filters 84, 88 have a passband which matches the excitation frequency range of the FR/IR dye, and allow the use of more general lamps and cameras, i.e. lamps whose emission spectra are not limited to the specific excitation wavelengths of the FR/IR dye, and cameras having broader sensitivity than to just the FR/IR dye emission spectra. One ink suitable for the purpose has an FR dye with a peak excitation frequency of 675 nanometers (nm), and an emission peak at 690 nm. Ideally, the camera filter 86 has a different passband from that of the lamp filters 84, 88, to keep the light energy from the illumination sources from entering the camera 72 and creating noise. Suitable filters for filters 84, 86 and 88 are commercially available. For example, an LS-650-F model filter from Corion, 73 Jeffery Avenue, Holliston, Mass. 01746, can be employed as the lamp filters 84, 88. This filter has a 650 nm cutoff, and passes energy with wavelengths below 650 nm. An S10-700-F model filter from Corion can be employed as filter 86. This filter is a bandpass filter with its passband centered at 700 nm and with a 10 nm passband. It is found that the LS-650-F filter passes sufficient IR energy at 675 nm to excite the FR dye in the ink, and the S10-700-F filter passes sufficient FR energy emitted by the dye at about 690 nm to produce good results. The use of off-the-shelf filter components provides a significant cost advantage in implementing the system.

The camera 72 comprising the scanner 70 is sensitive to the FR/IR band of interest, and particularly in this exemplary embodiment to the FR emission band of the FR dye in the ink used to print the barcode, and so will provide an FR image of the invisible ink barcode. The camera can be a CCD camera, but any camera having sensitivity in the spectral range of the FR emission from the dye can be employed. In an alternate embodiment, the camera 72 has sensitivity to the UV emissions from the UV dye in the ink forming the identification pattern, and captures an electronic image of the identification pattern in response to the emissions from the UV dye.

The exemplary embodiment illustrated in FIG. 1 is particularly suited to reading two-dimensional barcodes. The camera provides an image which is processed by the scanner to determine the barcode pattern. Data representing the sensed barcode image is provided to the system controller 100, which determines whether the document passed under the scanner has an expected barcode. For a multi-page document, the controller verifies whether all pages are accounted for. The controller can generate a warning if all pages are not accounted for. Thus, the final document produced by the system is verified to have all expected printed pages. The barcode used in the verification procedure is invisible under natural illumination, and so does not provide a visible image which is objectionable in appearance.

The printer 52, printer 60 and scanner 70 can all constitute one integrated machine. Alternatively, a document conveying system can be employed to convey documents or pages of documents as they are printed by machine 52, to the barcode printing station, and subsequently to the scanning station along the paper path. It is also contemplated that documents can be printed by one machine 52, manually carried or delivered to another printer machine 62 and subsequently manually carried to another scanner machine 70.

Figure 3:
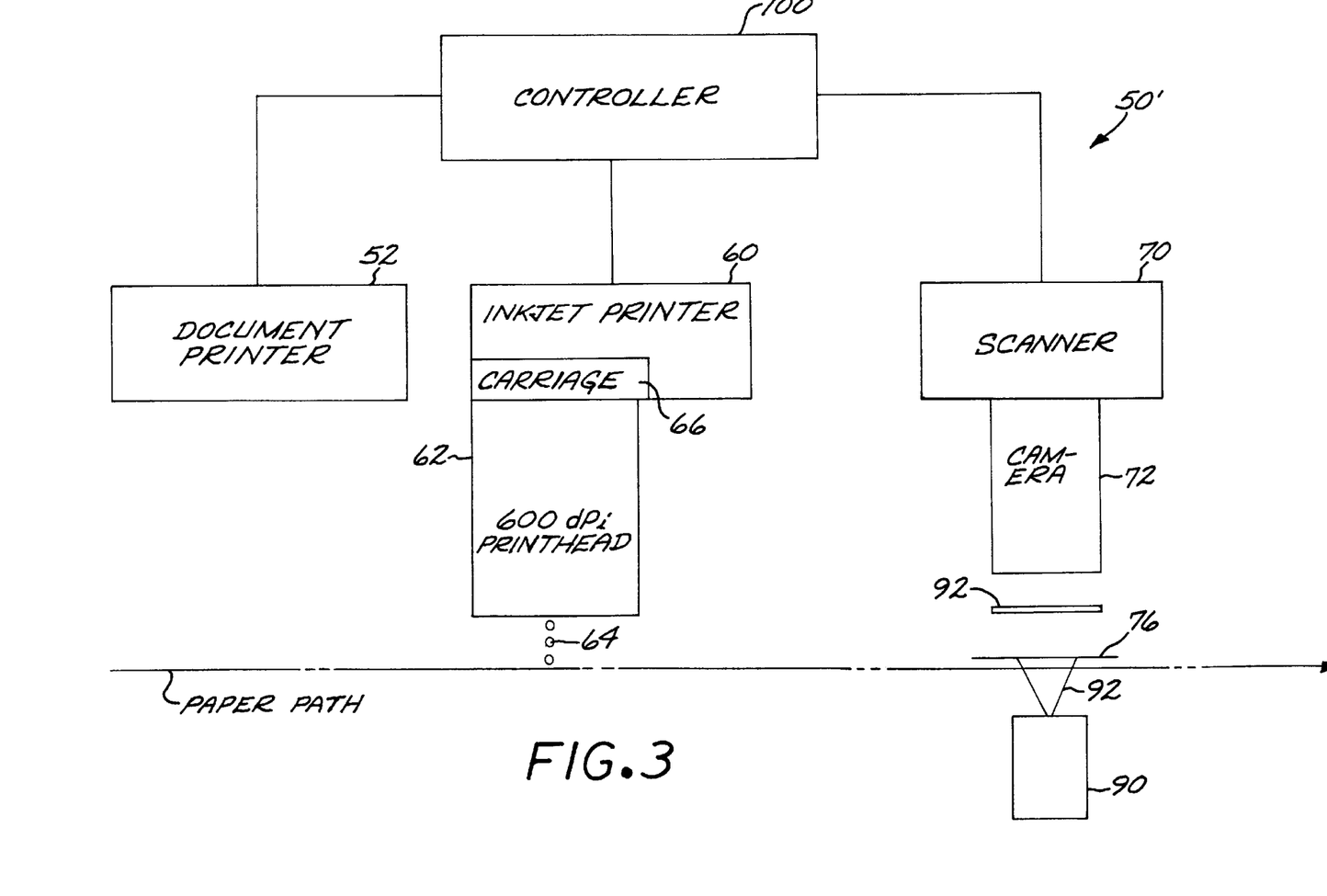
FIG. 3 is a schematic block diagram of a first alternate embodiment of a document printing and verification system in accordance with the invention.

An alternate embodiment of a printing and verification system in accordance with the invention is shown in FIG. 3. This system 50' has the same printer 52, inkjet printer 60 and printhead 62. The ink need not have the UV dye in this embodiment. The illumination source 90 for the scanner 70 is placed beneath the imaging zone 76 to backlight the print media being scanned. Particularly, the print media has two opposed surfaces. The barcode printer 60 prints the barcode on the first surface facing the printhead. The illumination source 90 directs an illumination beam with FR/IR energy onto the second surface. The longer wavelength (FR/IR) energy passes through the paper print medium well enough to excite the FR/IR dye in the ink forming the barcode printed on the top (first) side of the print medium, so that the barcode can still be imaged by the camera 72.

The backlighting provided by the embodiment of FIG. 3 provides several advantages. A single light source 90 can be employed, and its light beam 92 can provide a more uniform illumination than a side lighting from a single light source on the same side of the print media as the camera. The light source can be a laser, an LED, or the output from an optical fiber coupling a remotely located light source. Of course, a standard halogen light source could alternatively be employed. Another advantage is that the camera 72 will have a view of the sample being imaged which is unobstructed by the light source. Further, the light source can be positioned very close to the back surface of the print media, effectively reducing the required output intensity of the light source. Another advantage of the backlighting embodiment is that noise effects caused by glare, which can be a problem in the embodiment of FIG. 1., are eliminated.

Figure 4:
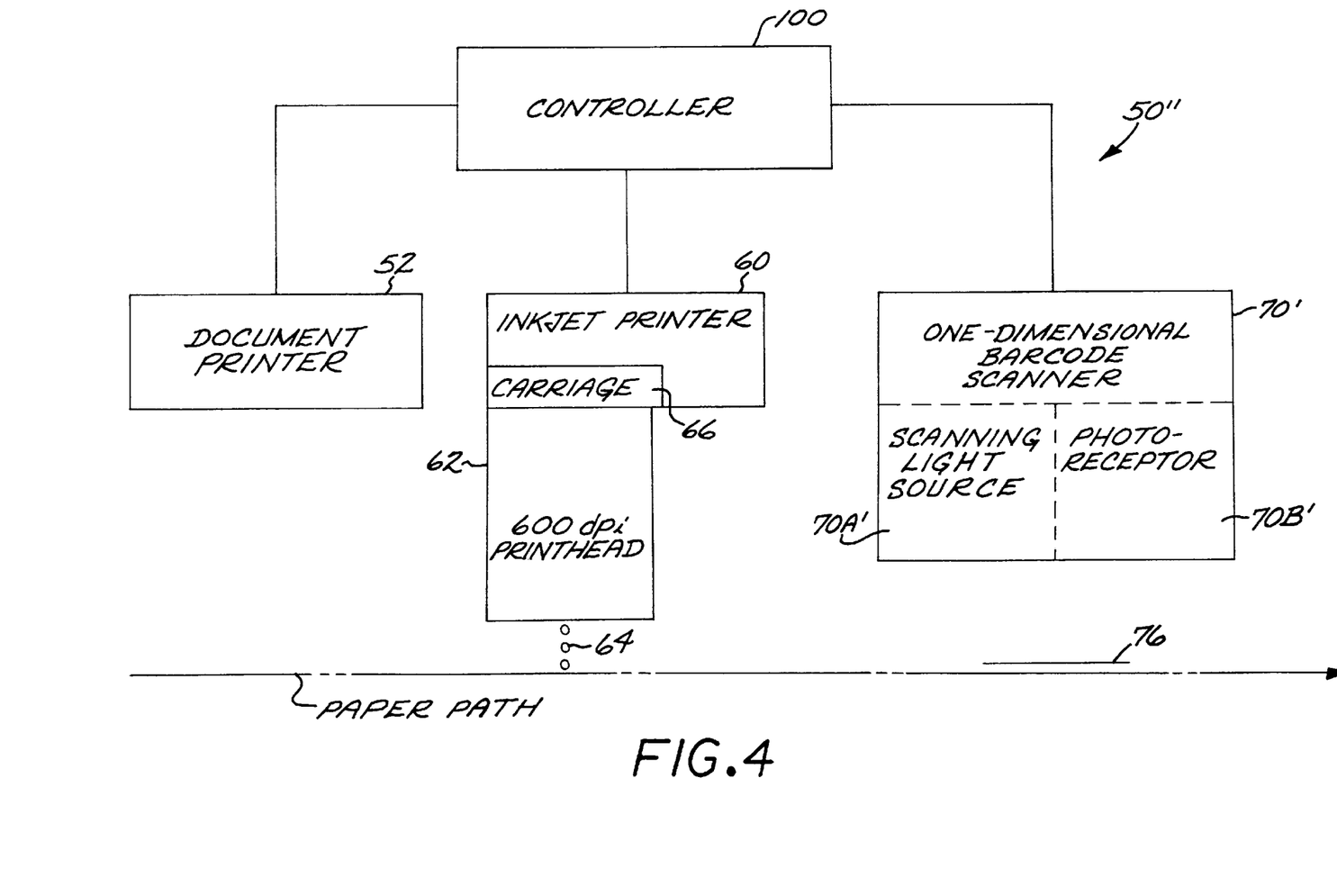
FIG. 4 is a schematic block diagram of a second alternate embodiment of a document printing system and verification system in accordance with the invention.

FIG. 4 is a generalized schematic diagram of a further alternate embodiment of a document printing and verification system in accordance with the invention. This system 50" has the same printer 52, inkjet printer 60 and printhead 62 as described with respect to the system of FIG. 1, but uses a one-dimensional barcode scanner 70' at the scanning station. The printer 60 can be simplified in this system, since it is only required to print a one-dimensional image. The scanner 70' can be implemented by use of an off-the-shelf one dimensional scanner system, which includes a scanning light source 70A' and a photoreceptor 70B'. One exemplary device suitable for the purpose is the Accusort model 22 uniform product code (UPC) scanner, marketed by Accusort Systems, Telford, Pa. 18969. The scanning light source of this commercial device is believed to be a laser source which emits FR energy at the excitation wavelength range of the FR/IR dye in the ink used by the printer 60, and the receptor sensitive to the FR/IR emission spectra of the dye. The device 70' performs the processing of the signals from the photoreceptor to provide an output signal to the controller 100 identifying the recognized barcode.

In each of the described embodiments, the pattern printed by the printer 60 has been described as a barcode. However, instead of a barcode, the invisible pattern can be other security or tracking indicia. For example, the image could be a document number, or provide the title of the document and/or pagination information. The pattern will be referred to in a general sense as an "identification pattern."

Figure 5:
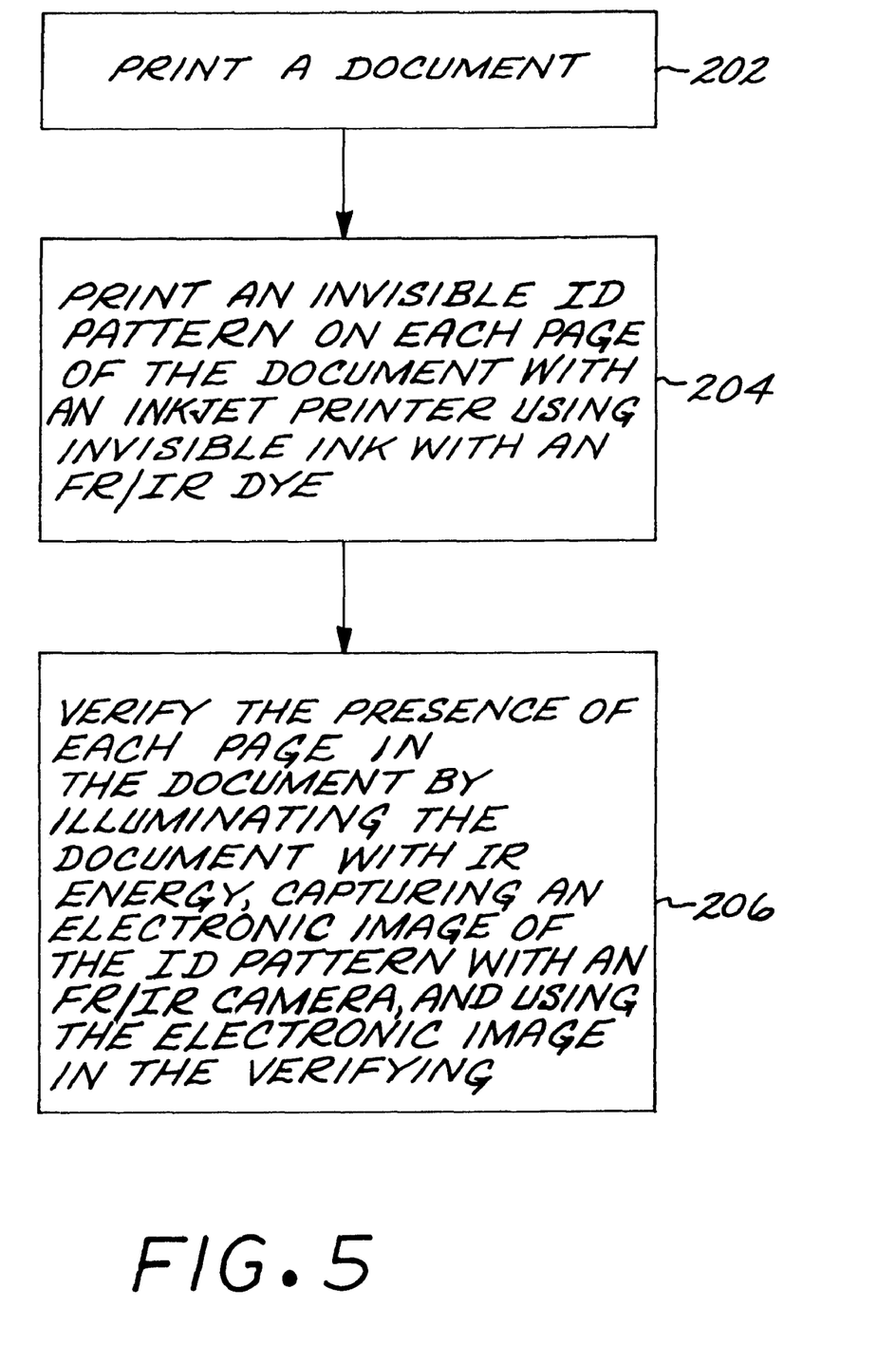
FIG. 5 is a flow diagram illustrating steps of a document printing and verification method using this invention.

FIG. 5 is a general flow diagram illustrating steps of a document printing and verification method in accordance with the invention. At step 202, the document is printed by a document printer. Next, at step 204, an invisible identification image is placed on each page of the document. This is done in an exemplary embodiment by an inkjet printer using an ink with an FR/IR dye. The identification pattern printed on the document is preferably different for each page, to provide a unique identifier for each page. At step 206, the verification step includes verifying the presence of each page in the document. This is done in the exemplary embodiment by illuminating the document with FR/IR energy, capturing an electronic image of the identification pattern with an FR/IR camera, and using the electronic image in the verification process.

In an exemplary printing/verification process, the document printer sequentially prints each page of the document, and the pages are sequentially sent along the paper path to the printer 60 and scanner 70. Alternatively, the document printer can operate in a "batch" fashion wherein complete documents are printed, and the complete documents are then passed page by page through the printer 60. The barcoded documents can then be assembled before the pages are scanned for verification, or alternatively sent page by page along the paper path between the printer 60 and scanner 70.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A document printing and verification system, comprising:
    a document printing apparatus for printing multi-page documents including text on print media;
    an inkjet printer apparatus comprising an inkjet printhead adapted to emit ink droplets of an invisible ink which is not visible to the unaided eye when viewed with natural light illumination for printing on each page of the multi-page document an invisible identification pattern which is not visible to the unaided eye when viewed with natural light;
    a scanner apparatus positioned for producing an image of said identification image for verification use, said scanner apparatus including a light source for illuminating an imaging zone with light including nonvisible energy components and a camera sensitive to nonvisible light from the print media to form an image of said nonvisible identification image; and
    a system controller for controlling the document printing apparatus and the inkjet printing apparatus and responsive to image signals from the scanner apparatus to verify the presence of each page of the multi-page document imprinted with said identification pattern.

2. The system of claim 1 wherein the inkjet printhead is a high resolution printhead adapted to provide inkjet printing resolution at least as high as 600 dots per inch.

3. The system of claim 1 wherein said ink droplets emitted by said printhead include a far red (FR)/infrared (IR) dye which produces FR/IR emissions in response to illumination in an FR/IR wavelength band, and said camera is sensitive to FR/IR emissions of said dye to form said image of said identification pattern which has been imprinted on said print media.

4. The system of claim 3 wherein said light source includes a halogen lamp.

5. The system of claim 1 wherein said printhead is positioned adjacent a first surface of said print media to print the identification pattern on said first surface, and said light source comprises a first illumination source positioned adjacent a first side of the camera to provide a first side illumination of the imaging zone, a first optical filter positioned in a first light path between the first source and the imaging zone, and a second illumination source positioned adjacent a second side of the camera to provide a second side illumination of the imaging zone, a second optical filter positioned in a second light path between the second source and the imaging zone, and a third optical filter disposed between a third light path between the imaging zone and the camera.

6. The system of claim 6 Therein said ink droplets emitted by said printhead include a far red (FR)/infrared (IR) dye which is excited by illumination in an FR/IR wavelength band, and said camera is sensitive to excitation of said dye to produce an identification pattern image of said excited FR/IR dye which has been imprinted on said print media.

7. The system of claim 1 wherein said ink droplets emitted by said printhead include a UV dye which is excited by illumination in a UV wavelength band, and said identification pattern becomes visible to the unaided eye when illuminated by light in the UV wavelength band.

8. The system of claim 1 wherein the scanner apparatus includes a first optical filter positioned between the light source and the imaging zone, and a second optical filter positioned between the imaging zone and the scanner apparatus.

9. The system of claim 1 wherein the scanner apparatus further includes optical filtering apparatus for blocking the nonvisible energy components from the light source from the camera.

10. The system of claim 9 wherein said optical filtering apparatus includes a first optical filter disposed in an illumination path between said light source and the imaging zone and a second optical filter disposed between the imaging zone and the camera.

11. The system of claim 1 wherein said identification pattern is a barcode pattern.

12. The system of claim 11 wherein said barcode pattern is a one dimensional barcode pattern, and said scanner apparatus includes a barcode reader.

13. The system of claim 11 wherein said barcode pattern is a two dimensional barcode pattern.

14. A document printing and verification system, comprising:
a medium path along which pages of a print medium are passed;
an electrophotographic printer for printing a multi-page document including text on said pages of said print medium;
an inkjet printer apparatus positioned along the medium path downstream of the electrophotographic printer, said printer apparatus comprising an inkjet printhead adapted to emit ink droplets of an ink which is not visible under natural illumination for printing an invisible barcode on said pages of the print medium which is invisible to the unaided eye under natural illumination;
a scanner apparatus positioned along the medium path downstream of the inkjet printer apparatus for producing an image of the barcode printed on each page of the multi-page document for verification use, said scanner apparatus including a light source for illuminating an imaging zone along said medium path with light including nonvisible energy components and a camera sensitive to illumination light from the print medium to form an image of said nonvisible barcode; and
a system controller for controlling the electrophotographic printer and the inkjet printing apparatus and responsive to image signals from the scanner apparatus to verify the presence of barcoded print media and that each page of the multi-page document is accounted for.

15. The system of claim 14 wherein said ink droplets emitted by said printhead include a far red (FR)/infrared (IR) dye which is excited by illumination in an FR/IR wavelength band, and said camera is sensitive to excitation of said dye to produce a barcode image of said excited FR/IR dye which has been imprinted on said print medium.

16. A document printing and verification system, comprising:
a document printing apparatus for printing multi-page documents including text on print media;
an inkjet printer apparatus comprising an inkjet printhead adapted to emit ink droplets of an invisible ink which is not visible to the unaided eye when viewed with natural light illumination for printing on each page of the multi-page document an invisible identification pattern which is not visible to the unaided eye when viewed with natural light, said ink droplets emitted by said printhead including a far red (FR)/infrared (IR) dye which produces FR/IR emissions in response to illumination in an FR/IR wavelength band, said printhead positioned adjacent a first surface of said print media to print the identification pattern on said first surface of each page;
a scanner apparatus positioned for producing an image of said identification image for verification use, said scanner apparatus including a light source for illuminating an imaging zone with light including nonvisible energy components and a camera sensitive to nonvisible light from the print media to form an image of said nonvisible identification image, said camera sensitive to FR/IR emissions of said dye to form said image of said identification pattern which has been imprinted on said print media;
wherein said light source comprises a source of FR/IR energy positioned adjacent a second surface of said print media at the imaging zone to provide a backside illumination of the imaging zone, and said camera is positioned adjacent said first surface, said light source adapted to pass sufficient FR/IR energy through the print media to excite said FR/IR dye in said ink forming said identification pattern; and
a system controller for controlling the inkjet printing apparatus and responsive to image signals from the scanner apparatus to verify the presence of each page of the multi-page document imprinted with said identification pattern.

17. A method for document printing and verification, comprising the following steps:
printing a multi-page document with text visible to the unaided eye under natural light illumination;
printing an identification pattern on a first surface of each page of said document using an inkjet printer, said pattern printed with ink which is invisible to the unaided eye under natural light illumination, said ink including an far red (FR)/infrared (IR) dye which is excited by FR/IR energy;

illuminating a second surface of each document page with light energy including FR/IR energy to pass sufficient FR/IR energy through said page to excite the identification pattern formed by said ink including an FR/IR dye;

electronically capturing an image of said identification pattern on said first surface for each document page at said imaging zone by imaging said identification pattern onto a camera sensitive to FR/IR energy; and performing a verification procedure using said electronically captured image for each page to verify that all pages of the multi-page document are accounted for.

18. The method of claim 17 wherein said printing step includes printing the identification pattern with a high resolution printhead to provide a resolution of at least 600 dots per inch.

19. The method of claim 17 wherein the identification pattern comprises a barcode pattern.

20. A document printing and verification system, comprising:

a document printing apparatus for printing multi-page documents including text on print media;

an inkjet printing apparatus comprising an inkjet printhead adapted to emit ink droplets of an invisible ink which is not visible to the unaided eye when viewed with natural light illumination, said inkjet printing apparatus for printing on each page of the multi-page document an invisible identification pattern which is not visible to the unaided eye when viewed with natural light, said droplets including a UV dye and a far red (FR)/infrared (IR) dye, said UV dye when excited by illumination in an UV wavelength band causing said identification pattern to be visible to the unaided eye, said far red (FR)/infrared (IR) dye producing FR/IR emissions in response to illumination in an FR/IR wavelength band;

a scanner apparatus for producing an image of said identification image for verification use, said scanner apparatus including a light source for illuminating an imaging zone with light including nonvisible energy components in said FR/IR wavelength band and a camera sensitive to excitation of said dye to produce an identification pattern image of said excited FR/IR dye which has been imprinted on said print medium; and a system controller for controlling the document printing apparatus and the inkjet printing apparatus and responsive to image signals from the scanner apparatus to verify the presence of each page of the multi-page document imprinted with said identification pattern.

21. The system of claim 20, including a source of UV radiation to illuminate the print medium and cause the identification image to be visible to the unaided eye to provide a visual indication of operability of the inkjet printing appa.

22. The system of claim 20, wherein the inkjet printhead is a high resolution printhead for providing inkjet printing resolution at least as high as 600 dots per inch.

23. The system of claim wherein said identification pattern is a barcode pattern.

24. A method for document printing and verification, comprising:

printing a multi-page document with text visible to the unaided eye under natural light illumination;

printing an identification pattern on each page of said document using an inkjet printhead emitting ink droplets of an invisible ink, said pattern invisible to the unaided eye under natural light illumination, the droplets including a UV dye and a far red (FR)/infrared (IR) dye, said UV dye when excited by illumination in an UV wavelength band causesss said identification pattern to be visible to the unaided eye, said FR/IR dye producing FR/IR emissions in response to illumination in an FR/IR wavelength band;

illuminating one or more pages of the document with UV radiation to cause the identification pattern to be visible to the unaided eye to provide a visual check of said identification pattern printing;

illuminating each document page with light energy including energy components in the FR/IR wavelength band;

electronically capturing an image of said identification pattern for each document page at an imaging zone; and performing a verification procedure using said electronically captured image for each page to verify that all pages of the multi-page document are accounted for.

25. The method of claim 24, wherein said identification pattern printing includes:

printing the identification pattern on a first surface of the document page; and said electronically capturing an image includes positioning a camera adjacent the imaging zone to be adjacent said first surface of said document page when the document page is positioned at the imaging zone.

26. The method of claim 25 wherein said illuminating each document page with light energy including energy components in the FR/IR wavelength band includes illuminating said first surface of said document page with said FR/IR energy components.

27. The method of claim 25, wherein said illuminating each document page with light energy including energy components in the FR/IR wavelength band includes positioning an illumination source of FR/IR adjacent a second surface of the document page when positioned at the imaging zone, and passing sufficient FR/IR energy through the document page to excite said FR/IR dye in said ink.

* * * * *

UNITED STATES PATENT AND TRADEMARK OFFICE
CERTIFICATE OF CORRECTION

PATENT NO. : 6,644,764 B2  
DATED : November 11, 2003  
INVENTOR(S) : Stephens, Jr.

It is certified that error appears in the above-identified patent and that said Letters Patent is hereby corrected as shown below:

Column 7,  
Line 10, delete "surface," and insert therefor -- surface of the print media, --.  
Line 21, delete "claim 6" and insert therefor -- claim 5 --  
Line 21, delete "Therein" and insert therefor -- wherein --.

Column 9,  
Line 57, delete "appa." and insert therefor -- apparatus. --.

Column 10,  
Line 4, after "claim", insert -- 20 --.  
Line 17, delete "causess" and insert therefor -- causes --.

Signed and Sealed this

Thirteenth Day of July, 2004

JON W. DUDAS  
*Acting Director of the United States Patent and Trademark Office*